A. JOHNSON.
AUTOMATIC FEEDER.
APPLICATION FILED JUNE 12, 1920.
1,417,741.
Patented May 30, 1922.
2 SHEETS—SHEET 1.
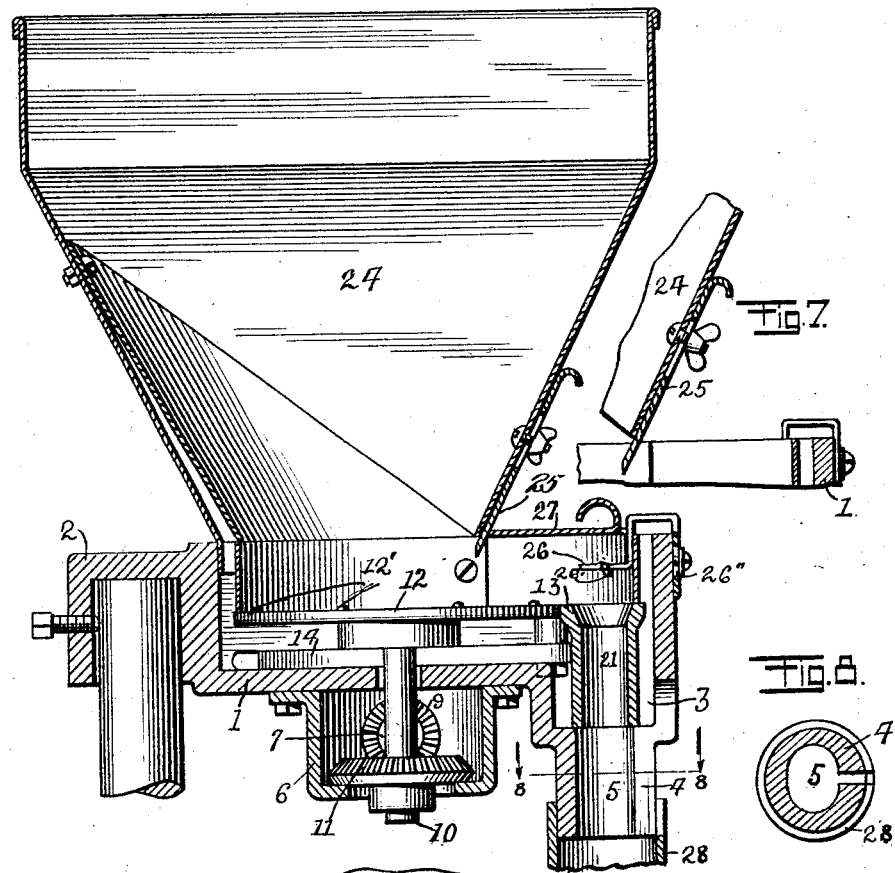
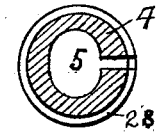
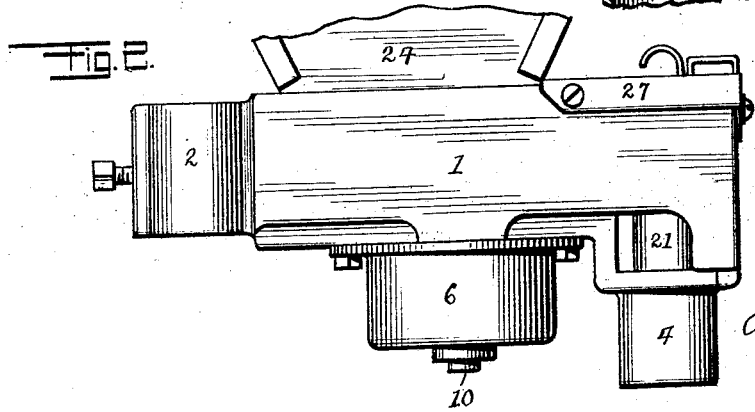

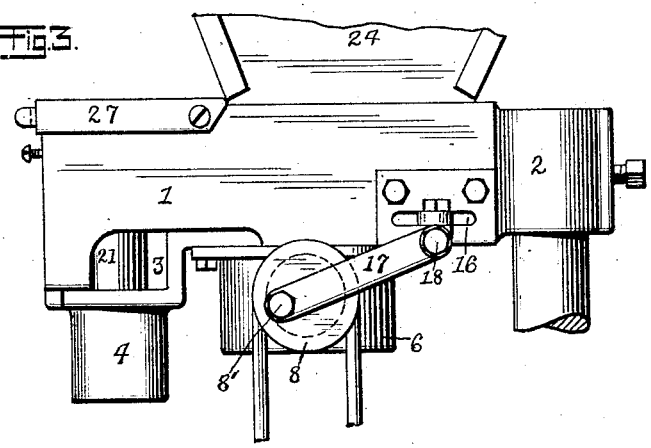
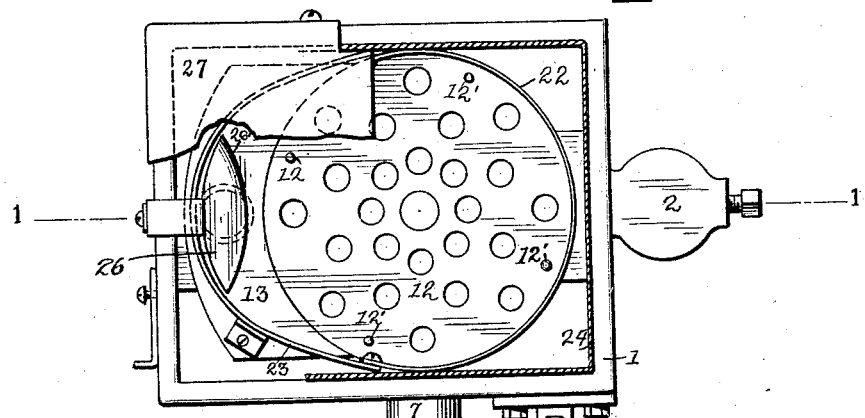
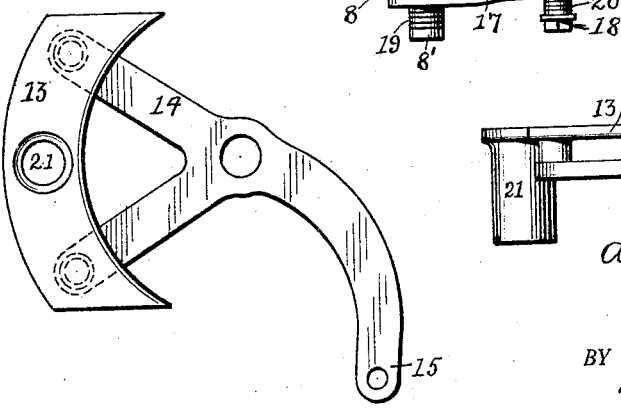

UNITED STATES PATENT OFFICE.

ARON JOHNSON, OF BROOKLYN, NEW YORK.

AUTOMATIC FEEDER.

1,417,741.　　　　Specification of Letters Patent.　　Patented May 30, 1922.

Application filed June 12, 1920. Serial No. 388,672.

*To all whom it may concern:*

Be it known that I, ARON JOHNSON, a citizen of the United States, residing at the borough of Brooklyn, New York city, in the county of Kings and State of New York, have invented certain new and useful Improvements in Automatic Feeders, of which the following is a specification.

My invention relates to improvements in automatic feeders intended to select objects from an indiscriminate mass in a hopper and deliver them in one position to conveying means which take them to the point where they are to be used or assembled with other objects. Primarily my feeder is intended to handle light objects like cork disks and deliver the same to assembling machines where they are combined with metal shells to produce bottle closures.

Heretofore considerable difficulty has been encountered in automatically feeding cork disks to assembling machines by reason of the extreme lightness of that material and girls have been employed to manually fill the cork tubes.

I have produced a feeder to replace this manual operation and in the drawing Fig. 1 is a side view thereof, in section; Fig. 2 a side view thereof with the hopper broken away; Fig. 3 a view of the other side thereof; Fig. 4 a top view thereof with the hopper in section; Fig. 5 a face view of the vibrator plate; Fig. 6 a side view of the plate of Fig. 5; Fig. 7 a sectional view of the hopper scraper; and Fig. 8 a cross-section of the outlet tube.

The feeder comprises a frame 1 having a bracket 2 at its rear end and a depressed portion 3 at its front with the connection 4 leading from the bottom thereof and provided with the oval opening 5, the front of the connection being cut out as shown in Fig. 1 to permit a view of the interior.

A gear box 6 is secured to the under side of the frame and carries the horizontal shaft 7 having the pulley 8 at its outer end and the mitre gear 9 at its inner end. A vertical shaft 10 carries a mitre gear 11 which meshes with the gear 9 at its lower end and a perforated plate 12 at its upper end above the bottom of the frame. This perforated plate has the small knobs 12' on its upper face to effect a hold on the mass of corks on the plate the rotation of this plate not only brings the mass to the outlet but also automatically carries away any surplus and prevents jamming at the outlet.

A vibrator plate 13 is carried on the arm 14, which arm is loosely mounted on the shaft 10 below the plate 12 and has its end extending through a slot 16 in the side of the frame. A crank pin 8' on the pulley 8 carries one end of a connecting rod 17, the other end of which engages a pin 18 on the projecting end 15 of the arm 14. To permit a slight universal movement of the connecting rod it loosely fits the pins and is pressed up into place by the springs 19 and 20. The vibrator plate 13 has its upper surface in the same plane as the plate 12 and an outlet 21, the bottom of which extends into the depressed portion 3 of the frame and rides on the upper end of the oval outlet 5.

A guard rail 22 extends around the back and sides of the plate 12 and a connecting rail 23 is secured to the vibrator plate 13 forming an enclosed space to receive the cork disks.

A hopper 24 is mounted over the revolving plate and is provided with a scraper slide 25 on its front which projects into the space within the guard rails, being adjustable for distance by the slot and screw shown in Fig. 7.

A baffle plate 26 is secured over the aperture 21 in the vibrator plate and a cover 27 may be provided to keep out dust and dirt.

This baffle plate 26 is oval in its general contour with pointed ends and has the down-turned lip 26' at one front, end edge to gradually direct the disks more positively into position over the outlet and is adjustable for distance above the outlet by means of the slot 26'' in its support.

In use a mass of corks is dumped into the hopper and they fall down onto the perforated plate. On revolving the pulley 8 the plate 12 revolves and the corks are spread over the space within the guard rails 22 and 23, being prevented from piling too high by the action of the scraper slide 25, any dust and dirt falling out through the apertures in the plate. While the plate 12 is revolving the vibrator plate is oscillating or moving rapidly from side to side in the arc of a circle, and the disks thereon are shaken into flat position and eventually get over and fall through the aperture 21 into the oval outlet passage 5, finally stacking up in the feed tube 23 from the lower end of which they are withdrawn by the assembling machine mechanism.

The baffle plate prevents the piling up and jamming of disks over the aperture 21 and the opening in the front of the connection 4 enables the operator to ascertain whether the feeder is functioning properly without opening it.

I claim:—

1. Automatic feeding apparatus comprising a frame provided with an outlet, a plate therein, means for rotating said plate, a vibrator plate therein and contiguous the rotary plate provided with an outlet alining with the frame outlet, and means for vibrating said plate.

2. Automatic feeding apparatus as is defined in claim 1 with guard rails enclosing said rotary plate and vibrator plate.

3. Automatic feeding apparatus as is defined in claim 1 with a baffle plate over the outlet.

4. Automatic feeding apparatus as is defined in claim 1 with a hopper thereover and a scraper slide projecting over the rotary plate.

5. Automatic feeding apparatus comprising a frame provided with an outlet, a gear box thereon, a horizontal shaft therein, a pulley on the outer end and a mitre gear on the inner end of said shaft, a vertical shaft in said gear box, a mitre gear on the inner end of said shaft meshing with the first gear and a rotary plate on the upper end of said shaft, an arm mounted on the vertical shaft one end of which projects beyond the frame, a vibrator plate on said arm contiguous the rotary plate provided with an outlet alining with the frame outlet, and a connecting rod between the projecting arm end and the pulley.

6. Automatic feeding apparatus as defined in claim 5 with a hopper thereover, a baffle plate over the outlet and a scraper slide projecting over the rotary plate.

In testimony whereof I have affixed my signature.

ARON JOHNSON.